(12) United States Patent
Tarakanov et al.

(10) Patent No.: US 11,416,675 B1
(45) Date of Patent: Aug. 16, 2022

(54) SYSTEM, METHOD, AND COMPUTER PROGRAM FOR ELECTRONIC FORM CUSTOMIZATION

(71) Applicant: Amdocs Development Limited, Limassol (CY)

(72) Inventors: Greta Tarakanov, Hadera (IL); Vladimir Tkach, Kefar Yona (IL); Diana Honik, Oranit (IL); Ada Gur-Karimov, Petakh Tikva (IL); Maria Morozov, Modiin (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/324,990

(22) Filed: May 19, 2021

(51) Int. Cl.
*G06F 40/174* (2020.01)
*H04L 67/306* (2022.01)
*H04L 67/50* (2022.01)
*G06F 40/186* (2020.01)

(52) U.S. Cl.
CPC .......... *G06F 40/174* (2020.01); *G06F 40/186* (2020.01); *H04L 67/22* (2013.01); *H04L 67/306* (2013.01)

(58) Field of Classification Search
CPC ... G06F 40/174; G06F 40/186; H04L 67/306; H04L 67/22
USPC ........................................................ 715/221
See application file for complete search history.

(56) References Cited

U.S. PATENT DOCUMENTS

| | | | |
|---|---|---|---|
| 5,557,723 A | 9/1996 | Holt et al. | |
| 7,958,011 B1* | 6/2011 | Cretney | G06Q 30/06 705/26.1 |
| 2004/0268229 A1* | 12/2004 | Paoli | G06F 40/174 715/200 |
| 2006/0059434 A1* | 3/2006 | Boss | G06F 16/9535 715/780 |
| 2006/0265640 A1* | 11/2006 | Albornoz | G06F 40/143 715/234 |
| 2008/0267505 A1* | 10/2008 | Dabet | G06F 40/174 382/181 |
| 2011/0131479 A1* | 6/2011 | Padgett | G06F 3/0481 715/223 |
| 2011/0252304 A1* | 10/2011 | Lemonik | G06F 16/958 715/234 |
| 2013/0046551 A1* | 2/2013 | Vahle | G06Q 10/10 705/2 |
| 2014/0258830 A1* | 9/2014 | Gormish | G06F 40/171 715/226 |
| 2014/0279573 A1* | 9/2014 | Coats | G06Q 30/0278 705/306 |
| 2019/0036853 A1* | 1/2019 | Denoue | G06F 40/174 |
| 2019/0188252 A1* | 6/2019 | Vityaz | G06F 3/0482 |
| 2020/0234003 A1* | 7/2020 | Bakman | H04W 4/50 |
| 2020/0279206 A1* | 9/2020 | Muttalib | G06Q 10/109 |

(Continued)

OTHER PUBLICATIONS

Drop Down Menu/Text Field in one; Jun. 24, 2015; Stack Overflow; pp. 1-8.*

(Continued)

*Primary Examiner* — Andrew R Dyer (74) *Attorney, Agent, or Firm* — Zilka-Kotab, P.C.

(57) ABSTRACT

As described herein, a system, method, and computer program are provided for customizing an electronic form. Events occurring in association with use of an electronic form are collected. The electronic form is automatically customized, based on the events.

14 Claims, 5 Drawing Sheets

(56) References Cited

U.S. PATENT DOCUMENTS

| | | | |
|---|---|---|---|
| 2021/0089618 A1* | 3/2021 | Jain | G06F 40/154 |
| 2021/0192129 A1* | 6/2021 | Garg | G06F 40/174 |
| 2021/0192134 A1* | 6/2021 | Yue | G06F 40/40 |
| 2021/0240766 A1* | 8/2021 | Nguyen | G06F 16/84 |
| 2021/0240919 A1* | 8/2021 | Nguyen | G06F 40/30 |

OTHER PUBLICATIONS

Ido Green; Help users checkout faster with Autofill; Sep. 3, 2019; Developers.Google.com; pp. 1-6.*

* cited by examiner

SYSTEM, METHOD, AND COMPUTER PROGRAM FOR ELECTRONIC FORM CUSTOMIZATION

FIELD OF THE INVENTION

The present invention relates to customizing electronic forms.

BACKGROUND

Electronic forms are graphical user interfaces (GUIs) configured to collect input data from a user using text fields, check boxes, etc. Electronic forms may be used in numerous applications, including web and mobile applications. For example, electronic forms may be used by an end user to apply for a service (e.g. loan, job, etc.), or even may be used by a customer service representative or other company employee in the course of company business to enter information (e.g. customer information) into a database.

Many times, electronic forms can be complex, requiring significant time for completion by the user. This may even be the case when not all parts of the form are required to be completed by the user. For example, the user may spend time even just scrolling through the form to find a particular input field that is relevant to the user. This problem is enhanced in the scenario described above where a company employee is responsible for filling out the same form time after time (e.g. for numerous different customers). To date, there is no solution that customizes (e.g. automatically simplifies) an existing electronic form for a user based on an anticipated use of the form by the user.

There is thus a need for addressing these and/or other issues associated with the prior art.

SUMMARY

As described herein, a system, method, and computer program are provided for customizing an electronic form. Events occurring in association with use of an electronic form are collected. The electronic form is automatically customized, based on the events.

DETAILED DESCRIPTION

Figure 1:
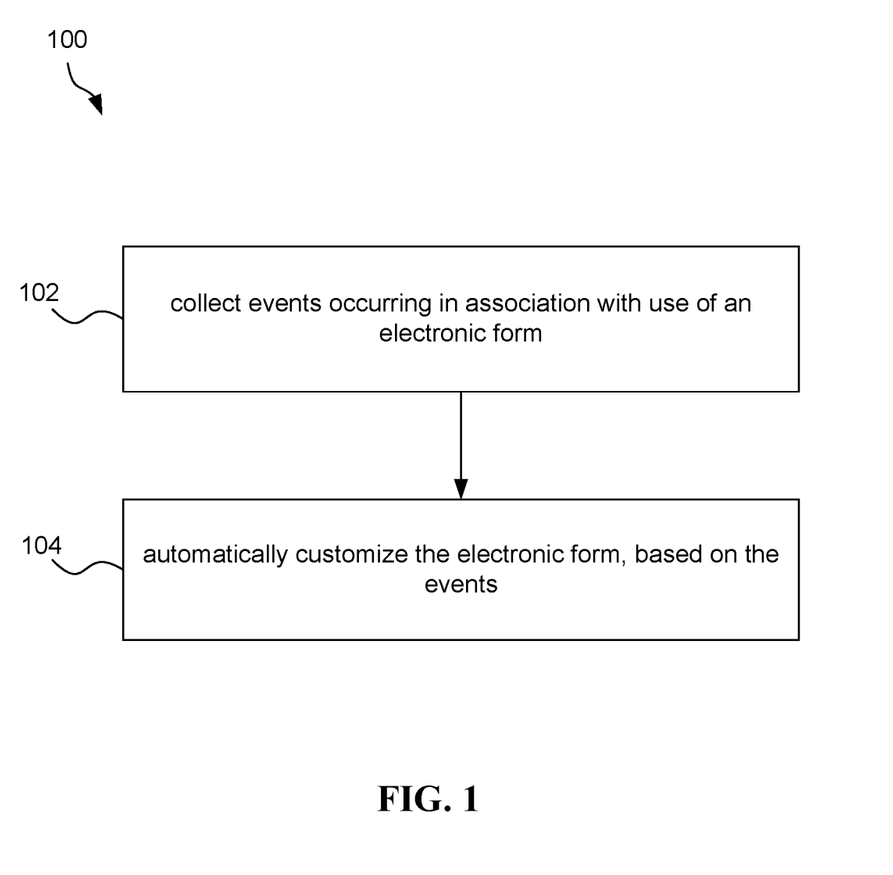
FIG. 1 illustrates a method for customizing an electronic form, in accordance with one embodiment.

FIG. 1 illustrates a method 100 for customizing an electronic form, in accordance with one embodiment. The method 100 may be performed by a computer system. For example, the method 100 may be performed by any of the computer systems described below with reference to FIGS. 4 and/or 5. As an option, the method 100 may be executed as part of an electronic form rendering application. Accordingly, the method 100 may be automated without requiring manual user input.

In operation 102, events occurring in association with use of an electronic form are collected. The electronic form refers to any interactive graphical user interface (GUI). For example, the electronic form may generally include a plurality of input fields, such as text boxes, check boxes, etc., for use by a user in providing input data to a backend system. The electronic form may be provided through a web application or a mobile application, in some embodiments.

To this end, the events occurring in association with the use of the electronic form may be data entry (by the user) in one or more of the input fields within the electronic form, a user click on one or more of the input fields within the electronic form, a user scrolling past one or more of the input fields within the electronic form or one or more pages of the electronic form, etc. The events that are collected may be initiated by a particular user, in one embodiment, or by any users accessing the form, in another embodiment. Thus, the events may be collected over multiple separate uses of the electronic form. As an example, the events may be collected by detecting change events associated with the input fields within the electronic form.

In operation 104, the electronic form is automatically customized, based on the events. For example, select input fields of the electronic form may be modified, based on the events. As another example, select pages of the electronic form may be modified, based on the events. Where the events were collected for a particular user, the electronic form may optionally be customized for that particular user. In another embodiment where the events were collected for various users, the electronic form may be customized for any user of the electronic form.

The events may be analyzed, in one embodiment, in order to determine one or more modifications to be made to the electronic form. In this embodiment, the electronic form may then be automatically customized according to the one or more modifications. The analysis may include determining a degree (or trend) of use of each of the input fields and/or pages of the electronic form. As another option, the analysis may include ranking the input fields within the electronic form, for example, from most used input field to least used input field and/or according to an importance factor preconfigured for each of the input fields. For this option, the one or more modifications to the electronic form may be determined based on a result of ranking the input fields of the electronic form, including for example whether each input field is commonly used (e.g. ranked above a threshold) or not commonly used (e.g. ranked below a threshold).

In one embodiment, customizing the electronic form may include relocating one or more input fields within the electronic form. For example, one or more commonly used input fields within the electronic form, as determined from the collected events, may be relocated to a visible area being displayed (e.g. displayed when the electronic form is loaded).

In another embodiment, customizing the electronic form may include reordering a sequence of input fields within the electronic form. For example, commonly used input fields may be placed above less commonly used input fields within the electronic form, so that the user will view the commonly used input fields first when scrolling through the form.

In yet another embodiment, customizing the electronic form may include removing one or more input fields within the electronic form. In still yet another embodiment, customizing the electronic form may include collapsing one or more input fields within the electronic form, for example that are not commonly used, into an expandable menu option on the electronic form.

To this end, the method 100 may be performed to customize an electronic form in accordance with actual past usage of the electronic form. This customization may streamline use of the electronic form by a user, by allowing the user to more quickly access portions of the form that are, at least most likely, of interest to the user.

As a further option, an input for one or more input fields within the electronic form may also be determined. For example, the input may be determined based on the collected events, such as particular input data commonly entered into a particular input field of the electronic form. The input may then be suggested to a user of the electronic form, for example as a menu associated with a corresponding input field.

As yet another option, the customization of the electronic form may be stored in a settings profile for the electronic form. The settings profile may store different customizations of the electronic form, for example for different users or different user groups. Optionally, the settings profile for the electronic form may also include a ranking of input fields within the electronic form that is determined based on the collected events and an importance factor preconfigured for each of the input fields. In any case, the settings profile may allow the customizations to be retrieved and used to render the form, depending on the user accessing the form.

While various embodiments are described above with respect to modifying a layout of the input fields within the electronic form in order to customize the electronic form, it should be noted that these embodiments may equally apply to pages of the electronic form. For example, one or more pages of the electronic form may be relocated, reordered, removed, collapsed, etc., based on the collected events.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
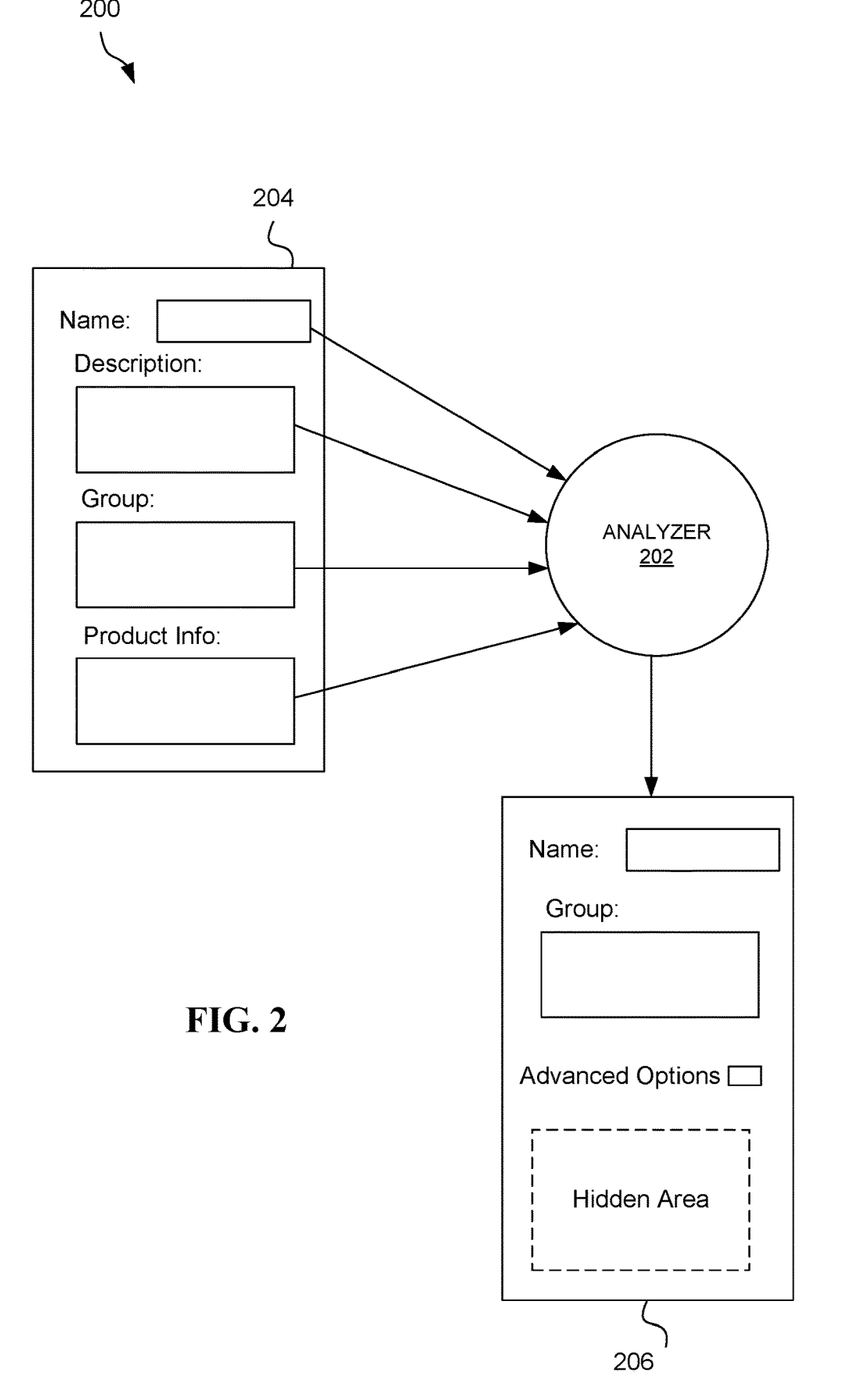
FIG. 2 illustrates a system flow diagram for customizing an electronic form, in accordance with one embodiment.

FIG. 2 illustrates a system 200 flow diagram for customizing an electronic form, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, an analyzer 202 collects events occurring in association with use of an electronic form 204. The analyzer 202 may collect the events by detecting change events associated with the input fields within the electronic form 204. The analyzer 202 may store the collected events in a local or remote memory.

The analyzer 202 is an application that may be locally situated with respect to a device on which the electronic form 204 is displayed (i.e. an end user device) or with respect to a device on which a source of the electronic form 204 executes (e.g. a server, etc.). Or course, in other embodiments the analyzer 202 may be remote to such devices.

Based on the collected events, the analyzer 202 automatically customizes the electronic form 204 to generate a customized electronic form 206. For example, select input fields of the electronic form 204 may be modified and/or select pages of the electronic form 204 may be modified, based on the events, to generate the customized electronic form 206.

The analyzer 202 may analyze the events, in one embodiment, in order to determine one or more modifications to be made to the electronic form 204. In this embodiment, the electronic form may then be automatically customized according to the one or more modifications. The analysis may include determining a degree (or trend) of use of each of the input fields and/or pages of the electronic form. As another option, the analysis may include ranking the input fields within the electronic form, for example, from most used input field (i.e. input field with the most change events) to least used input field (i.e. input field with the least change events) and/or according to an importance factor preconfigured for each of the input fields. For this option, the one or more modifications to the electronic form may be determined based on a result of ranking the input fields of the electronic form, including for example whether each input field is commonly used (e.g. ranked above a threshold) or not commonly used (e.g. ranked below a threshold).

In another embodiment, the analyzer 202 may use by using machine learning to determine most useful scenarios for the electronic form 204, less used (and unused) input fields of the electronic form 204, and/or suggestions for filling in input fields with a most effective result.

In the example shown, select input fields ("Description" and "Product info") of the electronic form 204 are collapsed into an expandable menu option ("Advanced Options") within the customized electronic form 206. The input fields may be selected as a result of their ranking being below some defined threshold, or otherwise as a result of a determination from the events that the input fields are less commonly used than other input fields of the electronic form 204. Upon selection of the menu option, the select input fields may be displayed in the customized electronic form 206 (i.e. in the "Hidden Area").

To this end, the customized electronic form 206 may be a simplified version of the electronic form 204. This simplification may streamline use of the electronic form by a user, by allowing the user to more quickly access portions of the form that are, at least most likely, of interest to the user.

Figure 3:
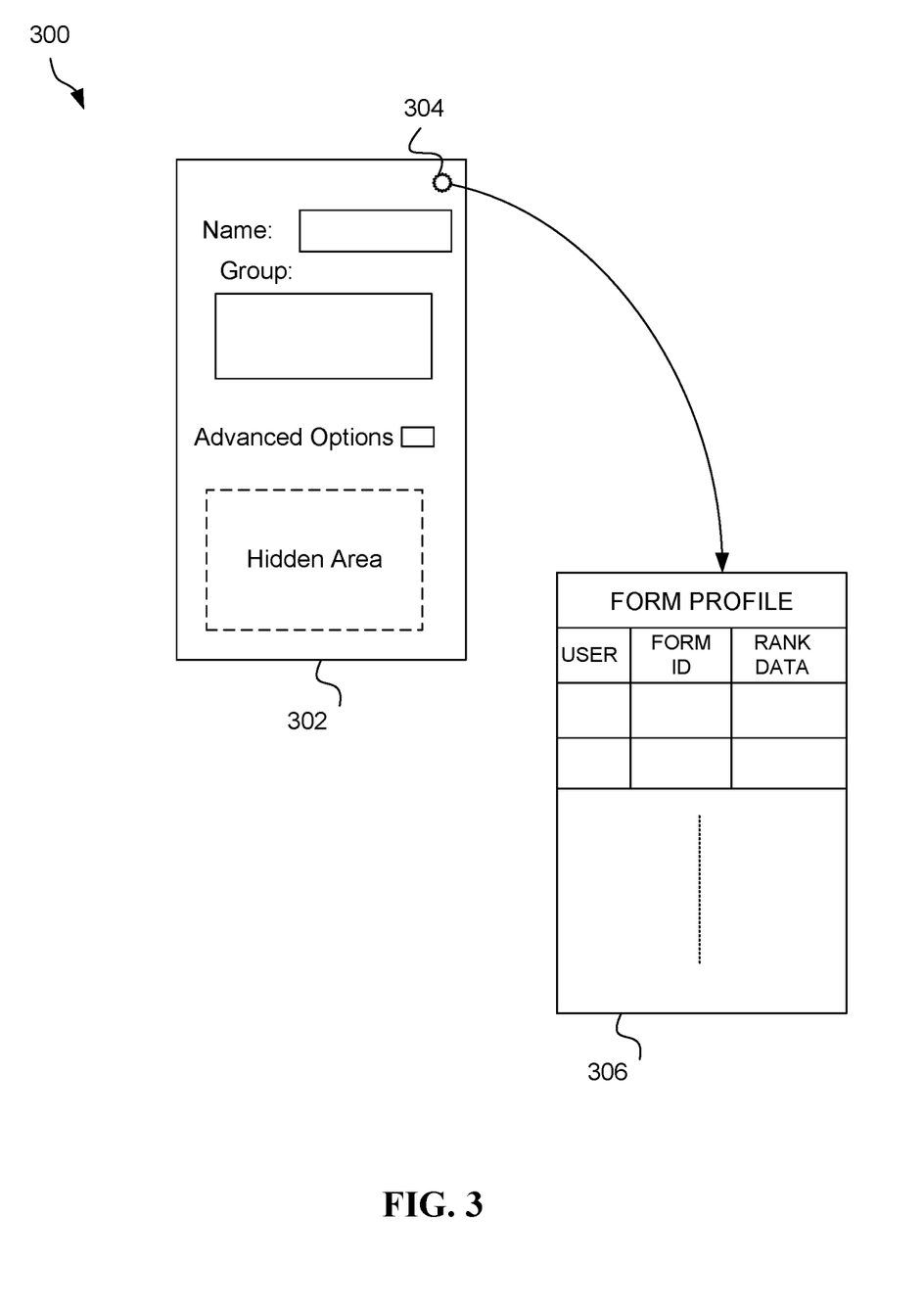
FIG. 3 illustrates a system flow diagram for saving settings for a customized electronic form in a form profile, in accordance with one embodiment.

FIG. 3 illustrates a system 300 flow diagram for saving settings for a customized electronic form in a form profile, in accordance with one embodiment. As an option, the system 300 may be implemented in the context of the details of the previous figure and/or any subsequent figure(s). Of course, however, the system 300 may be implemented in the context of any desired environment. Further, the aforementioned definitions may equally apply to the description below.

As shown, a customized electronic form 302 includes a settings button 304. The customized electronic form 302 of the present embodiment may be customized electronic form 206 of FIG. 2, for example. Upon selection of the settings button 304 by a user of the customized electronic form 302, one or more options may be presented to the user. The options may correspond to information stored in a settings profile 306 stored for an original version of the customized electronic form 302 (e.g. electronic form 204 of FIG. 2). The settings profile 306 may be stored in a database or file (e.g. accessible to analyzer 202 of FIG. 2).

The settings profile 306 may include a separate record for each user and/or for each version of the original form. Each record may store a user identifier ("User ID"), a form identifier ("Form ID") and input field rankings ("Rank Data"). Optionally, each record may also store a product version, a project identifier, and metadata indicating a layout/format of the version of the form corresponding to the form identifier, whether the form be the original or a simplified, reordered, etc. version of the original.

In one embodiment, the options may include an option to load a different customization of the original version of the customized electronic form 302 (e.g. which may correspond to a customization made for another user). The different customization may be accessed from the settings profile 306.

In another embodiment, the options may include an option to save a current customization in the settings profile 306 stored for the electronic form. In yet another embodiment, the options may include an option to reset the current customization (e.g. revert back to the original version of the customized electronic form 302) or to reset a select one or more modifications included in the customized electronic form 302). In still yet another embodiment, the options may include an option to view suggested settings based on best practices in the current form.

As an option, version backward compatibility may be provided for the same form per user (as indicated by the product version in the settings profile 306).

Figure 4:
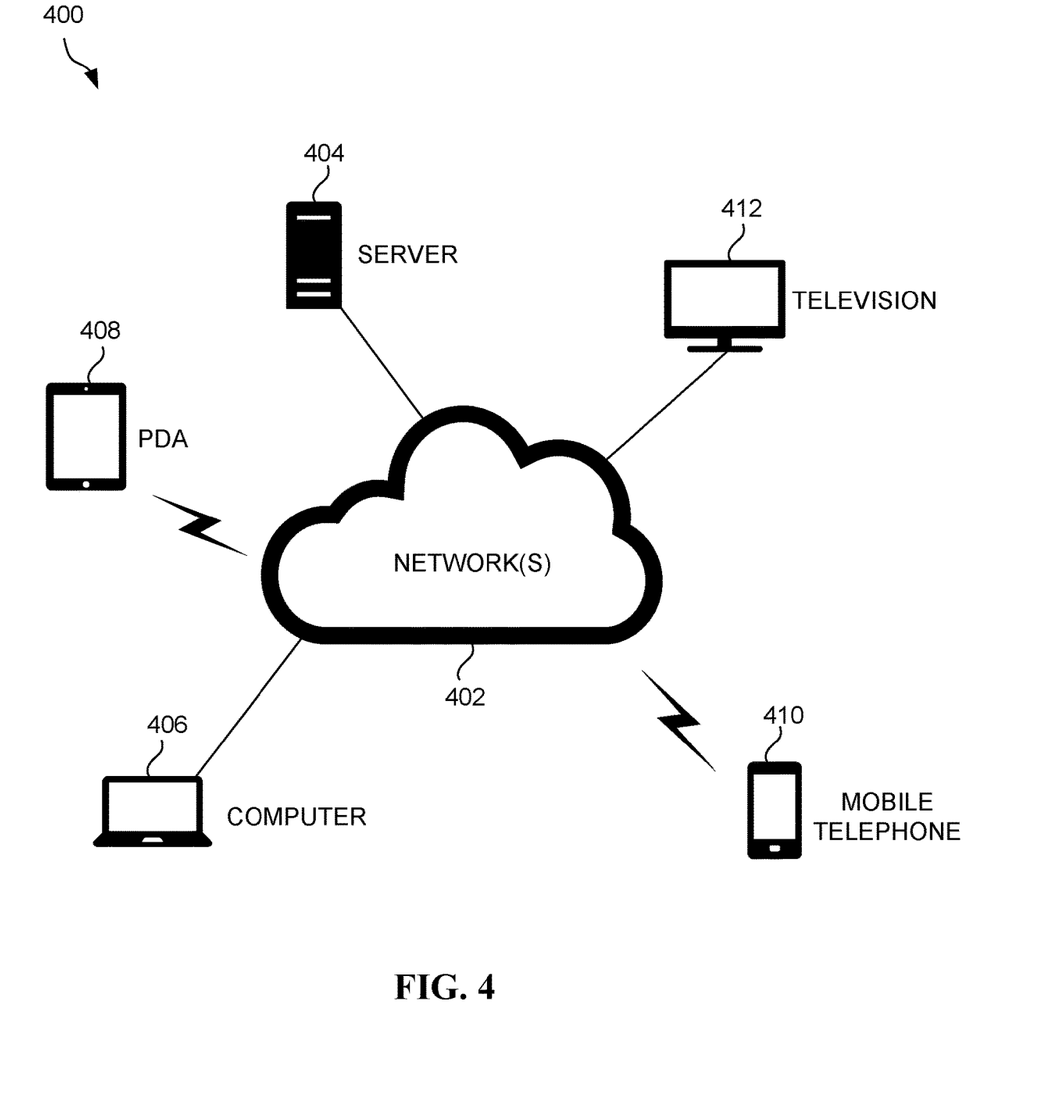
FIG. 4 illustrates a network architecture, in accordance with one possible embodiment.
Figure 5:
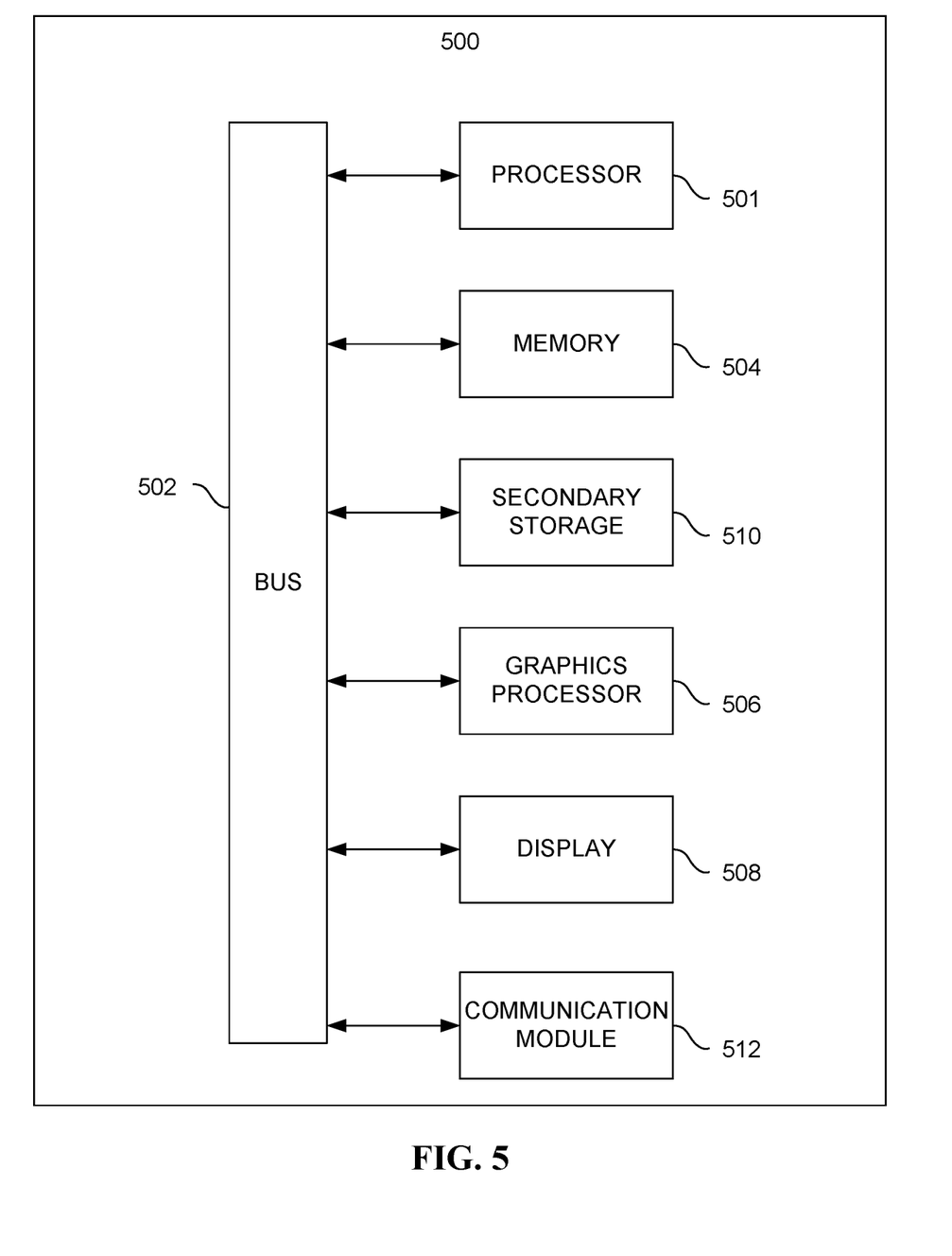
FIG. 5 illustrates an exemplary system, in accordance with one embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
at a computer system having a non-transitory computer-readable media storing computer instructions executed by one or more processors:
collecting events occurring in association with use of input fields of an electronic form;
analyzing the events to determine a degree of use of each of the input fields;
ranking the input fields according to the degree of use of each of the input fields and an importance factor preconfigured for each of the input fields;
automatically generating a customization of the electronic form, wherein the customization relocates one or more of the input fields within the electronic form in accordance with the ranking;
storing the customization of the electronic form in a settings profile of the electronic form, wherein the settings profile stores different customizations of the electronic form for different users, and wherein the settings profile includes a separate record for each user and for each of the different customizations, and wherein each of the separate records stores a user identifier, a form identifier, an input field rankings, and metadata indicating a layout of the one of the different customizations corresponding to the form identifier;
receiving a user request to access the electronic form;
retrieving, from the settings profile of the electronic form, one of the different customizations corresponding to a user associated with the user request;
rendering the electronic form for use by the user, in accordance with the retrieved one of the different customizations, wherein the rendered electronic form includes a settings button that is user selectable to present options;
receiving a selection of the settings button by the user; and
presenting the options to the user, the options including:
a first option to load an original version of the electronic form,
a second option to reset a select one or more modifications included in the retrieved one of the different customizations used to render the electronic form, and
a third option to load another one of the different customizations of the electronic form, wherein the another one of the different customizations of the electronic form corresponds to a customization generated for another user.

2. The method of claim 1, wherein the events include data entry in one or more of the input fields within the electronic form.

3. The method of claim 1, wherein the events include a user click on one or more of the input fields within the electronic form.

4. The method of claim 1, wherein the events are initiated by a particular user.

5. The method of claim 4, wherein the electronic from is automatically customized for the particular user.

6. The method of claim 1, wherein the one or more input fields that are relocated within the electronic form include one or more of the input fields that are ranked above a threshold, and wherein the one or more input fields are relocated to a visible area being displayed.

7. The method of claim 1, wherein customizing the electronic form includes reordering a sequence of the input fields within the electronic form.

8. The method of claim 7, wherein reordering a sequence of the input fields within the electronic form includes placing commonly used input fields, which are ranked above a threshold, at a location within the electronic form that is above less commonly used input fields, which are ranked below the threshold.

9. The method of claim 1, wherein the customization further includes removing an additional one or more of the input fields from within the electronic form.

10. The method of claim 1, wherein the customization further includes collapsing an additional one or more of the input fields into an expandable menu option on the electronic form.

11. The method of claim 1, further comprising:
determining an input for one or more of the input fields within the electronic form; and
suggesting the input to the user of the electronic form.

12. The method of claim 11, wherein the input is determined based on the collected events.

13. A
non-transitory computer-readable media storing computer instructions which when executed by one or more processors of a device cause the device to:
collect events occurring in association with use of input fields of an electronic form;
analyze the events to determine a degree of use of each of the input fields;
rank the input fields according to the degree of use of each of the input fields and an importance factor preconfigured for each of the input fields;
automatically generate a customization of the electronic form, wherein the customization relocates one or more of the input fields within the electronic form in accordance with the ranking;
store the customization of the electronic form in a settings profile of the electronic form, wherein the settings profile stores different customizations of the electronic form for different users, and wherein the settings profile includes a separate record for each user and for each of the different customizations, and wherein each of the separate records stores a user identifier, a form identifier, an input field rankings, and metadata indicating a layout of the one of the different customizations corresponding to the form identifier;
receive a user request to access the electronic form;
retrieve, from the settings profile of the electronic form, one of the different customizations corresponding to a user associated with the user request;
render the electronic form for use by the user, in accordance with the retrieved one of the different customizations, wherein the rendered electronic form includes a settings button that is user selectable to present options;
receive a selection of the settings button by the user; and
present the options to the user, the options including:
a first option to load an original version of the electronic form,
a second option to reset a select one or more modifications included in the retrieved one of the different customizations used to render the electronic form, and
a third option to load another one of the different customizations of the electronic form, wherein the another one of the different customizations of the electronic form corresponds to a customization generated for another user.

14. A system, comprising:
a non-transitory memory storing instructions; and
one or more processors in communication with the non-transitory memory that execute the instructions to:
collect events occurring in association with use of input fields of an electronic form;
analyze the events to determine a degree of use of each of the input fields;
rank the input fields according to the degree of use of each of the input fields and an importance factor preconfigured for each of the input fields;
automatically generate a customization of the electronic form, wherein the customization relocates one or more of the input fields within the electronic form in accordance with the ranking;
store the customization of the electronic form in a settings profile of the electronic form, wherein the settings profile stores different customizations of the electronic form for different users, and wherein the settings profile includes a separate record for each user and for each of the different customizations, and wherein each of the separate records stores a user identifier, a form identifier, an input field rankings, and metadata indicating a layout of the one of the different customizations corresponding to the form identifier;
receive a user request to access the electronic form;
retrieve, from the settings profile of the electronic form, one of the different customizations corresponding to a user associated with the user request;
render the electronic form for use by the user, in accordance with the retrieved one of the different customizations, wherein the rendered electronic form includes a settings button that is user selectable to present options;
receive a selection of the settings button by the user; and
present the options to the user, the options including:
a first option to load an original version of the electronic form,
a second option to reset a select one or more modifications included in the retrieved one of the different customizations used to render the electronic form, and
a third option to load another one of the different customizations of the electronic form, wherein the another one of the different customizations of the electronic form corresponds to a customization generated for another user.

* * * * *